(12) United States Patent
Woo et al.

(10) Patent No.: US 8,007,158 B2
(45) Date of Patent: Aug. 30, 2011

(54) LIQUID CRYSTAL DISPLAY USING DIFFERENT LIGHT RADIATION ANGLES OF LIGHT EMITTING DIODES

(75) Inventors: Seung-Gyun Woo, Masan-si (KR); Young-Bee Chu, Suwon-si (KR); Ik-Soo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 56 days.

(21) Appl. No.: 11/874,042

(22) Filed: Oct. 17, 2007

(65) Prior Publication Data

US 2008/0316767 A1   Dec. 25, 2008

(30) Foreign Application Priority Data

Jun. 19, 2007   (KR) .................. 10-2007-0059720

(51) Int. Cl.
  *F21V 7/04* (2006.01)
(52) U.S. Cl. ........... 362/612; 362/621; 362/800; 349/65
(58) Field of Classification Search ................. 362/235, 362/612, 621, 800; 349/61–62, 65, 69
  See application file for complete search history.

(56) References Cited

U.S. PATENT DOCUMENTS

| 6,577,073 B2 * | 6/2003 | Shimizu et al. | ............... 315/246 |
| 6,913,366 B2 * | 7/2005 | Lee | .................................. 362/628 |
| 6,976,779 B2 * | 12/2005 | Ohtsuki et al. | ................ 362/608 |

FOREIGN PATENT DOCUMENTS

| JP | 2004-177890 | 6/2004 |
| JP | 2006-031941 | 2/2006 |
| KR | 2003-0018789 | 3/2003 |

\* cited by examiner

*Primary Examiner* — Jason Moon Han
(74) *Attorney, Agent, or Firm* — Innovation Counsel LLP (57) ABSTRACT

A liquid crystal display with low manufacturing cost, small dark area and compact exterior is provided by utilizing a plurality of differently radiating light emitting diodes at different angles. The liquid crystal of present invention includes a thin film transistor panel for displaying image, a backlight assembly for providing light to the thin film transistor panel with a plurality of light emitting diodes with different light radiation angles and a light guiding plate, and a frame unit for encompassing the thin film transistor panel and the backlight assembly. The light emitting diodes are placed either at the mid-point of light incident surface or the corner portion of the light guiding plate.

14 Claims, 5 Drawing Sheets

LIQUID CRYSTAL DISPLAY USING DIFFERENT LIGHT RADIATION ANGLES OF LIGHT EMITTING DIODES

This application claims priority to Korean Patent Application No. 2007-59720, filed on Jun. 19, 2007 and all the benefits accruing therefrom under 35 U.S.C. §119, and the contents of which in its entirety are herein incorporated by reference.

BACKGROUND OF THE INVENTION

1. Field of the Invention

The present invention relates to a liquid crystal display (LCD) backlight assembly, and more particularly, the present invention relates to a backlight assembly using different radiation angles of different light emitting diodes for low manufacturing cost, compact exterior and luminance efficiency.

2. Description of the Related Art

As display devices are used in everyday life, the liquid crystal display (LCD) has been gaining popularity. The LCD has a thin film transistor (TFT) panel which includes a pair of opposing substrates with a liquid crystal layer therebetween. The LCD also has a backlight assembly since the liquid crystal layer is not self-emissive. The backlight assembly is located behind the TFT panel to provide light to the liquid crystal layer. With light from the backlight assembly, transmittance of the TFT panel is controlled by arranging the liquid crystal molecules for each pixel.

The backlight assembly is classified into two groups according to the location of a light source, a direct light backlight assembly and an edge light backlight assembly. In the edge light backlight assembly, the light source is located at a lateral side of a light guiding plate (LGP) which is placed between the TFT panel and the light source. A linear fluorescent lamp has been mainly used as the light source, but point light sources such as a light emitting diode (LED) are also popular for a small LCD.

Being a semiconductor device, the merit of an LED lies in long lifetime, low power consumption and compact exterior. However, on the other hand, a LED has the demerit of limited light emitting angle which is called a light radiation angle. In an edge light backlight assembly, the LGP has a dark area close to a light incident area due to a limited light radiation angle of the LED and has low space efficiency for illuminating.

To improve the low efficiency, an increased number of LEDs or a widened radiation angle for each LED may be used. However, in order to widen the radiation angle for each LED, each of the LED packages must be altered raising the LED package price. Accordingly, an increased number of LEDs or widening radiation angle of each LED may lead to high manufacturing cost, high power consumption and a bulky exterior.

BRIEF SUMMARY OF THE INVENTION

Accordingly, it is an aspect of the present invention to provide a backlight assembly with less of a dark area and a compact exterior with a low manufacturing cost by using different radiation angles of different LEDs.

According to an embodiment of present invention, an LCD includes a TFT panel, a backlight assembly and a frame unit. The TFT panel has a pair of transparent glasses, a liquid crystal layer inbetween the glasses and a pair of polarizers attached to each glass to selectively pass light in response to the electric charge of each pixel.

The backlight assembly has a plurality of light emitting diodes (LEDs), a light guiding plate (LGP) next to the LEDs and at least one optical sheet above the LGP for providing uniform luminance to the TFT panel. Finally, the frame unit has an upper frame and a lower frame to enclose the TFT panel, and the backlight assembly unit to make LCD into one module.

Here, in the backlight assembly, a first LED has a first light radiation angle and a second LED has a second radiation angle while the LGP has a light incident surface, a light reflection surface, a first lateral surface and a second lateral surface.

In detail, the first LED faces the mid-point of the light incident surface; the second LEDs are paired and may be separated by the same distance from the mid point of the light incident surface and on opposite sides of the first LED. There, the second LEDs may face the corner portions at edges of the light incident surface where the light incident surface meets either the first lateral surface or the second lateral surface.

At the corner portion, the second LED may be slanted and, thus, may distribute its emitted light to the LGP more effectively. Namely, the light radiated to the outer area of the LGP can be minimized by placing the second LED at the corner portion of the LGP. With respect to above configuration, accordingly, the dark area of the LGP can be reduced and the whole backlight assembly can be compact.

According to another embodiment of the present invention, the first LED is placed out of the mid-point of the light incident surface while the second LED faces the corner portion at the edge of the light incident surface of the LGP.

According to yet another embodiment of the present invention, the corner portion has an additional surface located between the light incident surface and either of the first or second lateral surfaces of the LGP.

According to still another embodiment of the present invention, the second LED, at the corner portion of the LGP, has first and second radiation edge lines with respect to the light radiation angle. Here, either of the first or the second radiation edge lines extends into the gap between the lateral surface and active light emitting area of the LGP.

According to an alternate embodiment of the present invention, the LED has a package of flat light emitting faces whose thickness is less than the thickness of either light incident surface or corner portion of the LGP and is closely located near the LGP. Also, the LED package's outermost portion can exceed either the first or second lateral surface of the LGP.

According to yet another alternate embodiment of the present invention, the dark area of the LGP in the vicinity of the light incident surface has an inactive light emitting distance. The inactive light emitting distance may be the same or within the distance from the light of the incident surface to the active light emitting area of the LGP.

According to still another alternate embodiment of the present invention, the TFT panel has a first transparent substrate and a second transparent substrate which is larger than the first substrate with an area of circuitry unit. The circuitry unit overlaps with the inactive light emitting area of the LGP and/or LED packages. In addition, the top frame of the frame unit fully covers both the inactive light emitting area and LEDs while the top frame overlaps the edge portion of the first substrate.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF THE INVENTION

Reference will now be made in detail to exemplary embodiments of the present invention, examples of which are illustrated in the accompanying drawings, wherein like reference numerals refer to like elements throughout. The embodiments are described below in order to explain the present invention by referring to the figures.

Figure 1:
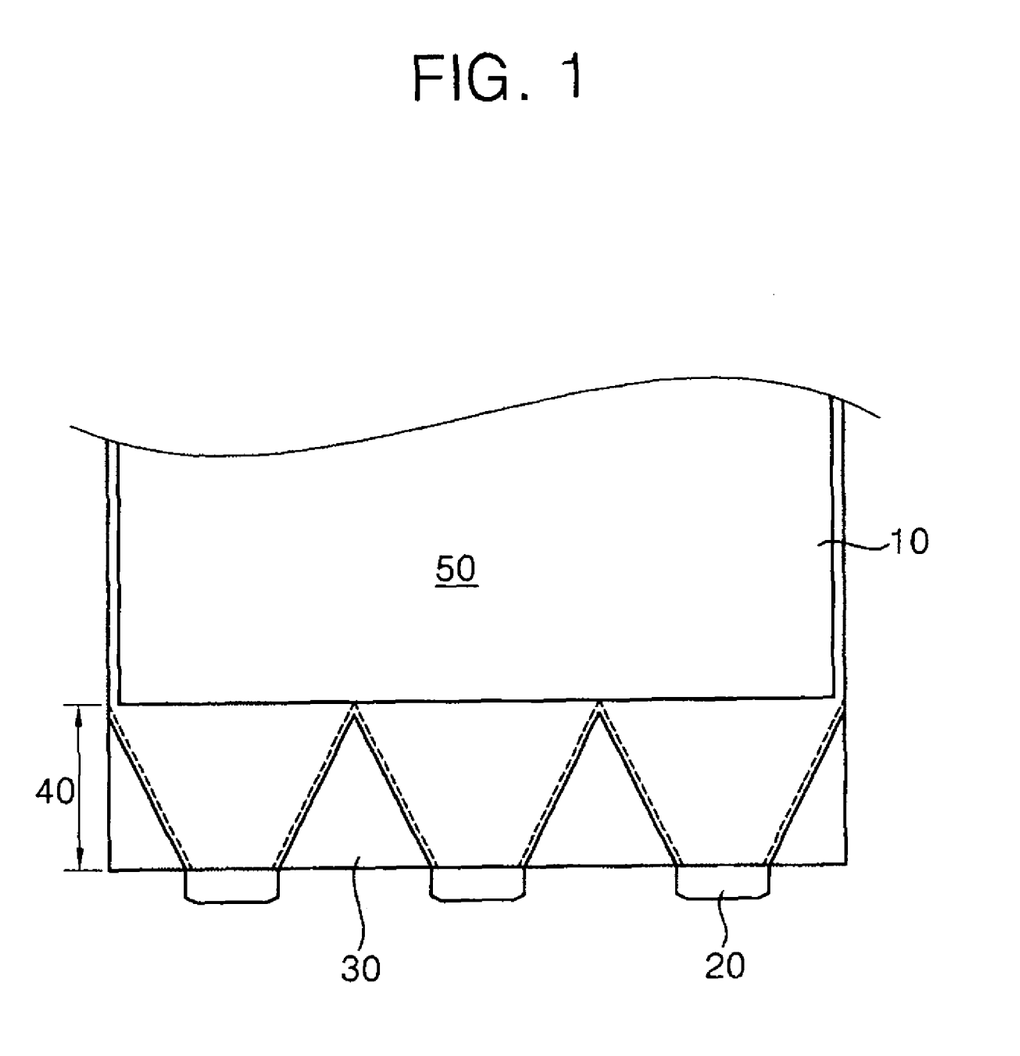
FIG. 1 is a plan view of a backlight assembly having a light guide plate (LGP) and a plurality of light emitting diodes (LEDs) with the same light radiation angle.

FIG. 1 is a plan view illustrating a dark area of a backlight assembly caused by a plurality of LEDs with the same light radiation angle. According to FIG. 1, the backlight assembly comprises an LGP 10 and a plurality of LEDs 20. Each LED 20 has a light emitting semiconductor chip enclosed by a package and accordingly has a limited light emitting range called light radiation angle 25. In detail, the light emitted from the LED 20 is spread within two edge lines which define the light radiation angle 25.

In FIG. 1, the backlight assembly includes three LEDs 20 whose light radiation angel 25 is 72 degrees. Due to the LEDs' linear arrangement and light radiation angle 25 of each LED 20, the backlight assembly has dark areas 30 between neighboring LEDs 20 in the vicinity of light incident surface 23. As a result, the dark area 30 and the region between the dark areas are useless for the display area of an LCD and is collectively called an inactive light emitting area. In other words, the inactive light emitting area has an inactive light emitting distance 40.

For example, the inactive light emitting distance is 7 mm when the length of the light incident surface is 33.9 mm and the light radiation angle of each LED is 72 degrees. Meanwhile, as the LCD should have a more effective display area, the inactive light emitting distance 40 should be minimized.

Figure 2:
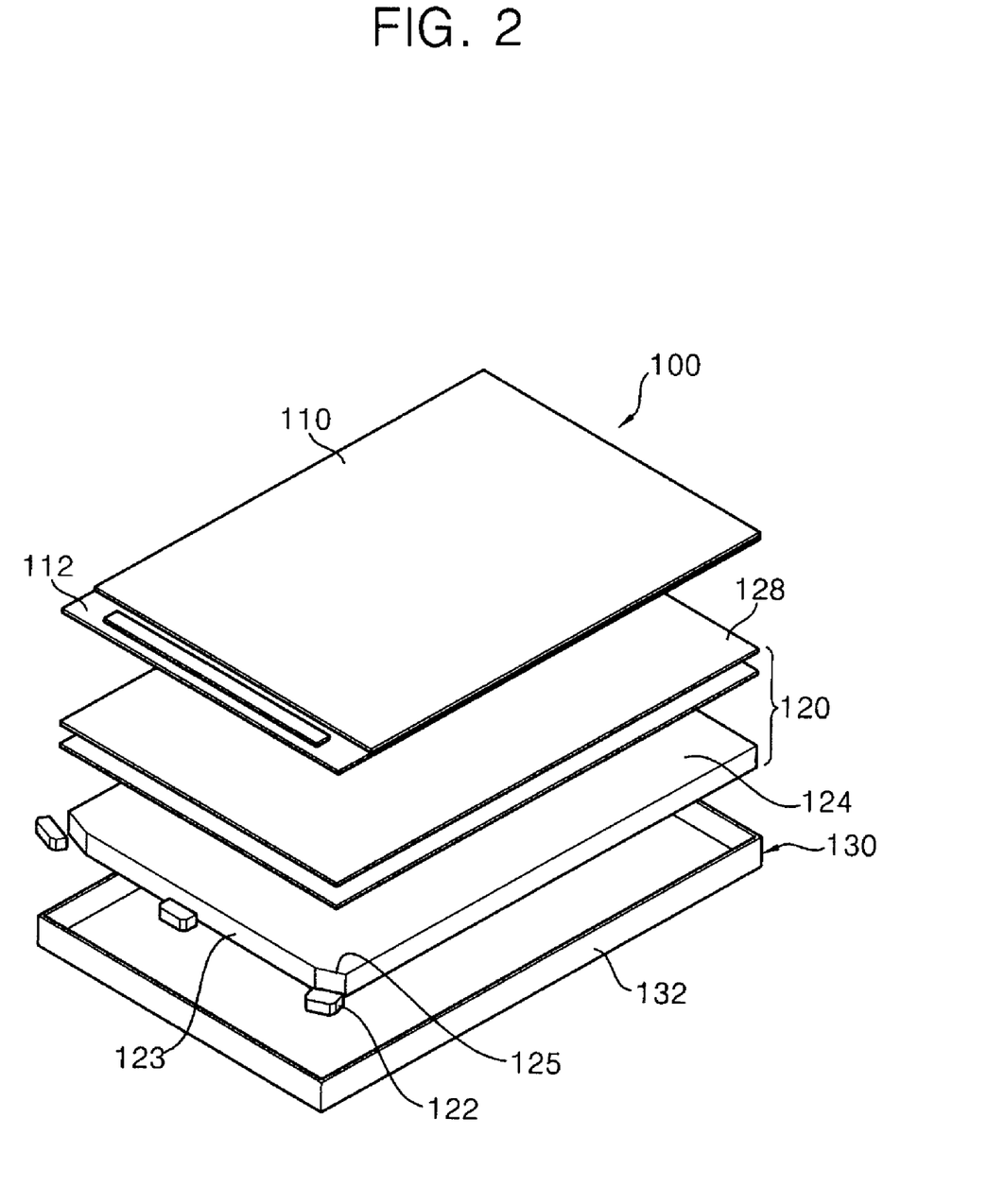
FIG. 2 is a perspective view of an exemplary embodiment of a liquid crystal display (LCD) having a plurality of LEDs whose light radiation angles are different from each other according to the present invention.

FIG. 2 is a perspective view of LCD 100 with different LEDs 122 facing the light incident surface 123 of the LGP 124. Here, each LED 122 has at least two different light radiation angles. In FIG. 2, LCD 100 includes a TFT panel 110, a backlight assembly 120 and a frame unit 132. The TFT panel 110 includes a liquid crystal layer and a pair of transparent glasses. Among the glasses, one glass is larger than the other to have circuitry unit 112. On the circuitry unit 112, a drive IC or film bonding area for connection with other driving circuits may be provided.

The backlight assembly 120 includes a light source 122 such as an LED, an LGP 124 for uniformly illuminating with the incident light from the light source 122, and at least one optical sheet 128 for accommodating luminance or uniformity enhancement.

The light source 122 may include a plurality of LEDs with at least two different light radiation angles. Further, each LED faces either the light incident surface 123 of the LGP 124 or the corner portion 125 at the edge of the light incident surface 123 of the LGP 124. Here, the LED 122 placed near the corner portion 125 of the LGP 124 can be slanted from the light incident surface 123 to effectively distribute its emitted light to the LGP 124.

The LGP 124 has an active light emitting area (not shown) which is substantially coincident with an active display area (not shown) of the TFT panel 110. Within the light emitting surface of the LGP 124, the inactive light emitting area may overlap with the circuitry unit 112 of the TFT panel 110. According to the present invention, the light source 122 and inactive light emitting area are collectively covered by the circuitry unit 112 of the TFT panel 110.

Finally, a frame unit 130 encompasses both the TFT panel 110 and backlight assembly 120 for completely assembling the LCD. The frame unit 130 includes a bottom frame 132 for accommodating the LGP 124 and top frame (not shown) for surrounding the edge of the TFT panel 110. Next, by conjoining the top frame and the bottom frame 132, the overall LCD is completed.

Figure 3:
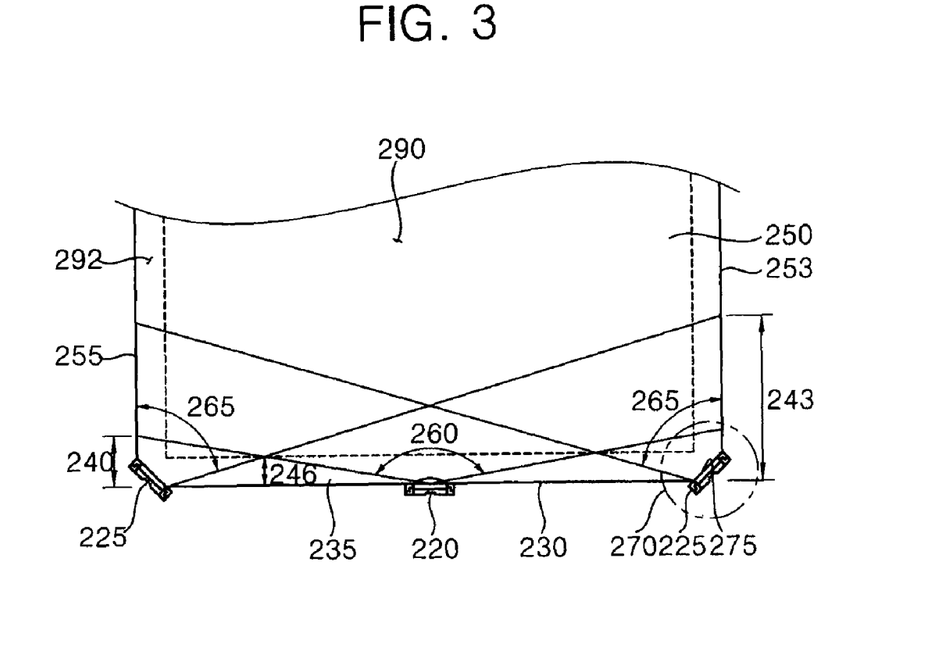
FIG. 3 is a plan view of an exemplary embodiment of a backlight assembly having LEDs in different angles according to the present invention.

FIG. 3 is a plan view of a backlight assembly having LEDs of at least two different light radiation angles. The backlight assembly of FIG. 3 includes a LGP 250, a first LED 220 and a plurality of second LEDs 225 and a series of optical sheets (not shown). The first LED 220 has a first light radiation angle 260 while facing the light incident surface 230 of the LGP 250. Meanwhile, the second LED 225 has a second light radiation angle 265 while facing the corner portion 270 of the LGP 250 where the edge of the light incident surface 230 and one of the lateral surfaces 255 of the LGP meet.

At the corner portion, the second LED 225 is slanted and, thus, may distribute its emitted light to the LGP 290 more effectively. Namely, the light radiated to outer area of LGP 290 can be minimized by placing the second LED 225 at the corner portion of the LGP 290. With respect to the above configuration, accordingly, a dark area of the LGP can be reduced and the whole backlight assembly can be compact.

According to the present invention of FIG. 3, the light radiation angles 260, 265 of the first LED 220 and the second LED 225 are different. For example, the first light radiation angle 260 is wider than 90 degrees; the second light radiation angle 265 is narrower than 90 degrees. As an exemplary embodiment, FIG. 3 has a first light radiation angle 260 of 160 degrees at the mid-point of light incident surface 230 and accordingly the first LED 220 has a first inactive light emitting distance 240. In the case of a 1.9 inch diagonal LCD, the light incident surface 230 is 33.9 mm long and results in an inactive light emitting distance 240 of 2.8 mm.

On the other side, the second LED 225 faces the corner portion 270 of the LGP 250, has a second light radiation angle 265 of 72 degrees and has a second inactive light emitting distance 243. Here, the corner portion 270 is a cutaway surface 275 meeting both the light incident surface 230 and the lateral surface 255 at opposing edges of the light incident surface 230. Specifically, the cutaway surface 275 is slanted to the light incident surface 230 at an angle of 54 degrees.

Assuming the same 1.9 inch diagonal LCD above, the second inactive light emitting distance 243 is 10.3 mm which is longer than the first inactive light emitting distance 240 of 2.8 mm.

However, applying both the first and second LED 220, 225 within the same LCD makes the final inactive light emitting distance 246 of the inactive light emitting area shorter than either the first or second inactive light emitting distance 240, 243 as can be seen in FIG. 3. The final inactive light emitting distance 246 is calculated to be 2.0 mm.

On the contrary, by assuming that the second LED 225 of FIG. 3 is moved to the same position of FIG. 1, the final inactive light emitting distance is changed to 7.0 mm. As a result, the elongated inactive light emitting distance has bad influence on the active light emitting area ratio within the light emitting surface of the LGP.

Figure 4:
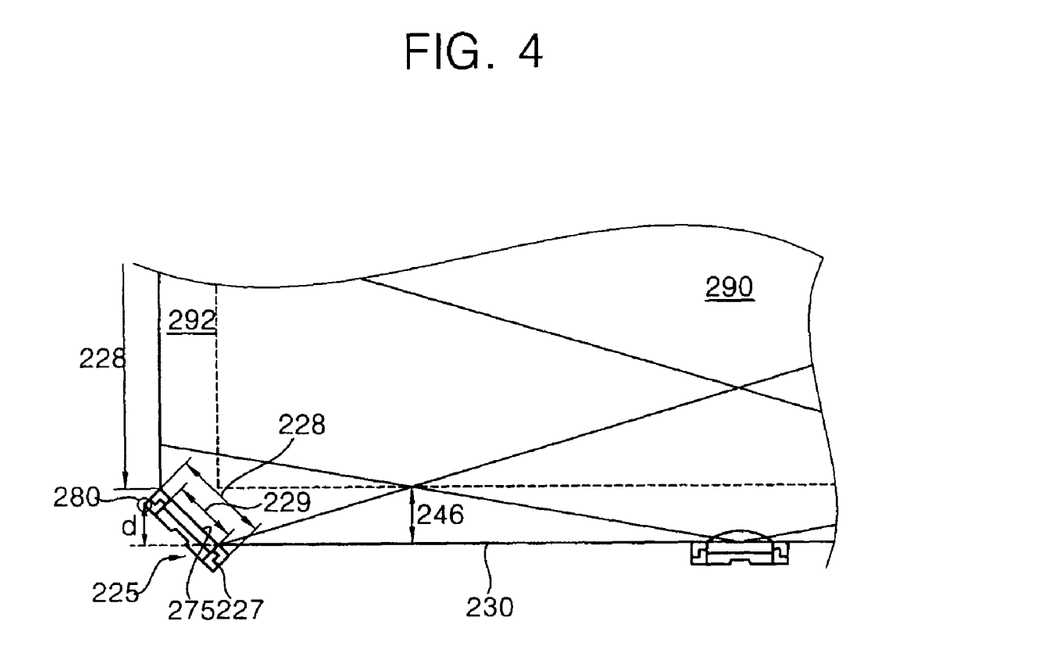
FIG. 4 is a plan view of an exemplary embodiment of a backlight assembly of FIG. 3 which shows a package of the LED and its relevance to a corner portion of an LGP according to the present invention.

FIG. 4 is another plan view of a backlight assembly showing a package of LEDs and its relevance to a corner portion of an LGP. For a brief explanation, the same elements shown in FIG. 3 are expressed with the same reference numeral and corresponding explanations will be omitted.

Referring to FIG. 4, the second LED 225 is a package 226 having a self emissive semiconductor (not shown) enclosed by a housing 227. Specifically, the housing 227 of the LED package 226 has a square shape with long sides and short sides. One of the long sides of the housing 227 is a flat LGP facing surface 228 which includes a light emitting opening 229.

Meanwhile, the LGP 290 of FIG. 4 has a slanted corner surface 275 at the edge of the light incident surface. The slanted corner surface 275 faces the LGP facing surface 228 of the LED 225 with a larger surface area than the light emitting opening 229 of the LED 225.

The long side of the LED package 226 is slanted to the light incident surface 230 and parallel with the corner surface 275 of the LGP; thus, the LED package 226 has an outermost portion 280. For designing the overall backlight, the outermost portion 280 should be within the region of extensive area from the inactive light emitting area of the LGP because outermost portion 280 within the extensive area of active light emitting area 290 of LGP may shrink the active light emitting area in turn. Therefore, the outermost portion 280 should be within the range extended from the inactive light emitting area. That is to say, the distance from the extensive line from the light incident surface 230 to the outermost portion 280 should be the same or shorter than the inactive light emitting distance 246.

Figure 5:
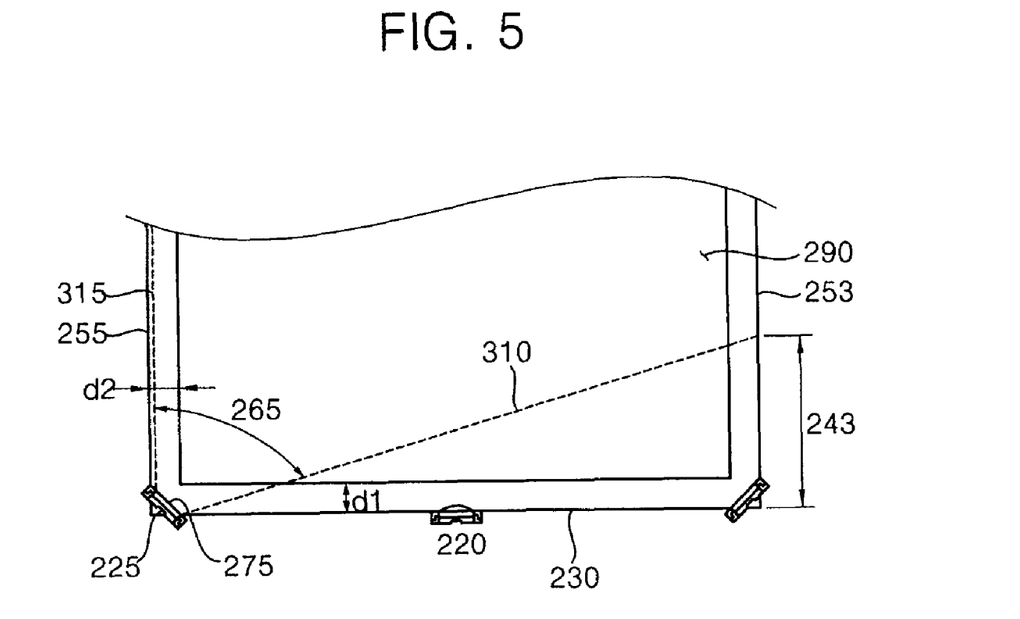
FIG. 5 is a plan view of an exemplary embodiment of a backlight assembly of FIG. 3 which shows the relevance of a light radiation angle of the LED and an active light emitting area of the LGP according to the present invention.

FIG. 5 is a plan view of a backlight assembly of FIG. 3 showing the relevance between a light radiation angle of the LED and the active light emitting area of the LGP. For a brief explanation, the same elements shown in FIG. 3 and FIG. 4 are expressed with the same reference numeral and corresponding explanations will be omitted.

With respect to FIG. 5, the LGP has the light incident surface 230, the corner surface 275 and the lateral surface 255 in a series. Further, the LGP has an active light emitting area 290 whose edges are spaced apart from the light incident surface 230 and lateral surface 255 of the LGP by distances d1 and d2 respectively.

The second LED 225 faces the corner surface 275 of the LGP and has a light radiation angle 265 defined by a first radiation edge line 310 and a second radiation edge line 315. Here, the first radiation edge line 310 is close to the light incident surface 230 while the second radiation edge line 315 is close to the lateral surface 255 of the LGP.

In this instance, the second radiation edge line 315 is located between the lateral surface 255 and the active light emitting area 290 to secure a maximized active light emitting area. In other words, if the second radiation edge line 315 exceeds the lateral surface 255, the first radiation edge line 310 will move toward the inner side of the active light emitting area 290. Then, radiation edge 310 prolongs the inactive light emitting distance 243. Consequently, the active light emitting area will be limited.

On the contrary, if the second radiation edge line 315 moves toward the inner space of light emitting surface 290, a dark area will be shown in close proximity to the second lateral surface 255 and prohibits the formation of an evenly illuminated light emitting area. As a result, the second radiation edge line 315 standing inbetween the second lateral surface 255 and the edge of active light emitting area 290 will promote the maximum ratio of active light emitting area on the light emitting surface of the LGP.

Figure 6:
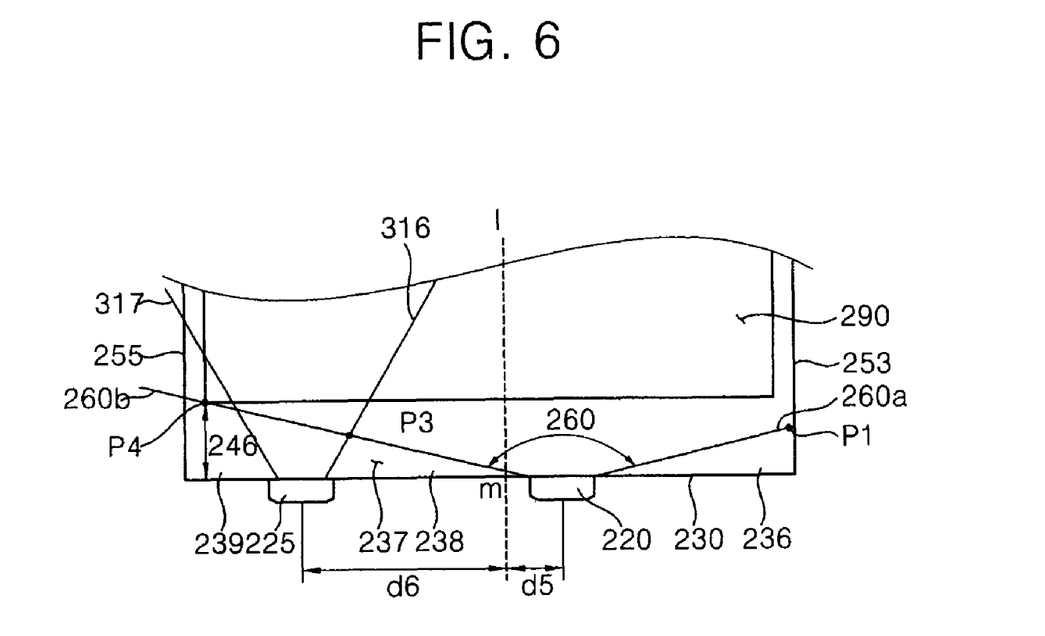
FIG. 6 is a plan view of an exemplary embodiment of a backlight assembly with the LED's location deviated from the mid-point of a light incident surface of the LGP according to the present invention.

FIG. 6 is a plan view of a backlight assembly wherein the LED is located at the point deviated from the mid-point of a light incident surface of the LGP. For a brief explanation, the same elements shown in FIGS. 3 through 5 are expressed with the same reference numeral and corresponding explanations will be omitted.

Referring to FIG. 6, the mid-point of the light incident surface 230 is denoted as m and the middle line extended from the mid-point is denoted as l. Here, the first LED 220 has a wider radiation angle 260 than the second LED 225 and is spaced apart from m by distance d5 to the first lateral surface 253. Thus, the first dark area 236 to the first lateral side 253 is narrower than the second dark area 237 to the second lateral side 255.

To solve the discrepancy, the second LED 225 may be positioned near the second lateral side 255 by a distance d6 from the mid-point d6. By applying both the first LED 220 and the second LED 225, the backlight assembly of FIG. 6 has three dark areas 236, 238, 239.

Specifically, the first dark area 236 is between a fourth light radiation edge 260a and the first lateral surface 253 whose shortest point to the active light emitting area is P1. The third dark area 238 is placed between a third light radiation edge 260b and the second light radiation edge 316 whose shortest point to the active light emitting area is P3. The fourth dark area 239 is disposed between a first light radiation edge 317 and the second lateral surface 255 whose contact point to the active light emitting area is P4.

Here, for making maximized light emitting area 290, the shortest points to the active light emitting area P1, P2, P3, P4 should be close to the light incident surface 230. Also, either the distance between the mid-point m and the first LED d5 or the distance between the mid-point m and the second LED d6 can be controlled to maximize the active light emitting area 290. In other words, to acquire the maximum active light emitting area 290 and minimize the inactive light emitting distance 246, the closest point among the dark areas to the edge of the active light emitting area in the vicinity of the light incident surface should be close to the light incident surface 230.

Hence, minimized fourth dark area 239 makes the shortest inactive light emitting distance 246 in FIG. 6. Furthermore, the asymmetric arrangement of LEDs' of FIG. 6 can be accomplished with fewer LEDs than the symmetric arrangement of LEDs' since the symmetric arrangement needs additional LEDs for symmetry. However, in considering the asymmetric arrangement of LEDs, the overall backlight assembly should have enough luminance for display.

Alternatively, to acquire the minimized fourth dark area 239, the edge line 317 of the second light radiation angle 265 meets the corner of the active light emitting area 290. In this respect, the narrower second light radiation angle 265 accommodates the second LED's location farther than the first LED's location from the mid-point m of the light incident surface 230.

In FIG. 6, even though the second LED 225 is positioned to face the light incident surface like the first LED 220 faces the light incident surface, the second LED 225 may be placed at the corner portion as long as one of the first and second light radiation edges 316, 317 of the second LED 225 exceeds the active light emitting area 290. When the second LED 225 is located at the corner portion at the cross region between the second lateral surface 255 and the incident surface 230, the first LED 220 can move farther from the mid-point m toward the first lateral surface 253 as long as adequate luminance uniformity in the active light emitting area 290 is acquired.

For example, when the second LED 225 has a radiation angle of less than 90 degrees and the first light radiation edge 317 is placed between the second lateral surface 255 and the active light emitting area 290, the second light radiation edge 316 still remains within the LGP; then, a third light radiation edge 260b of the first LED 220 can meet the second light radiation edge 316 at point P3. Here, as the first LED 220 moves toward the first lateral surface 253, the point P3 moves toward the light incident surface 230 which result in the expansion of active light emitting area 290.

Figure 7:
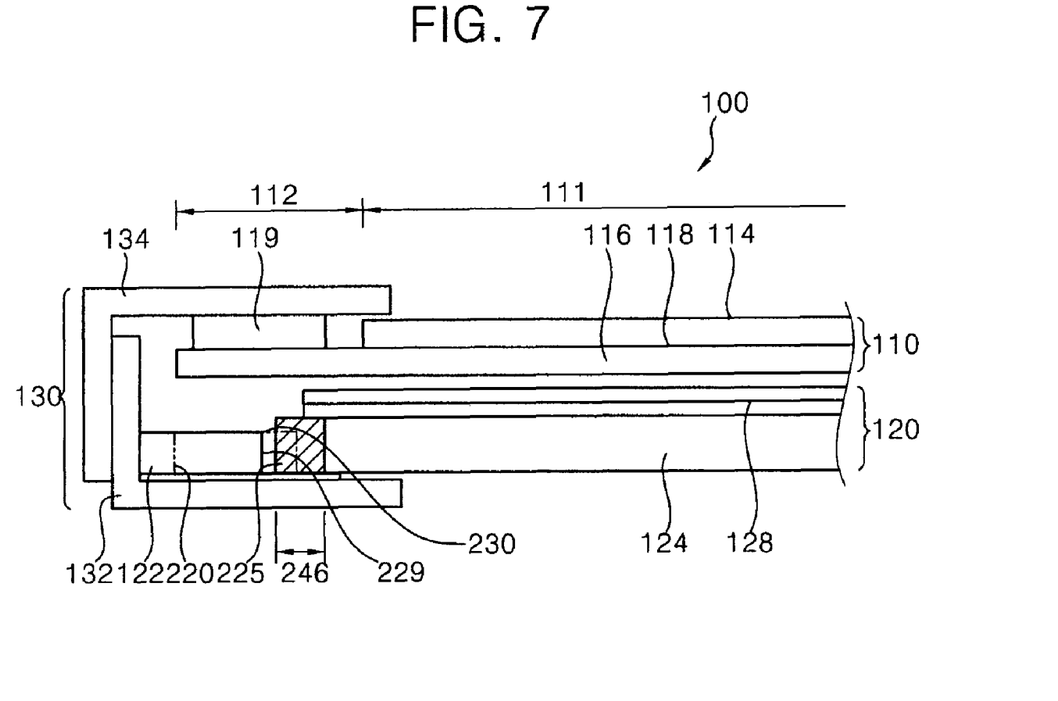
FIG. 7 is a cross-sectional view of an exemplary embodiment of the LCD, the LCD having a backlight assembly of FIG. 2 through FIG. 6, and a TFT panel overlapping the backlight assembly according to the present invention.

FIG. 7 is a cross-sectional view of the LCD having a backlight assembly of FIGS. 2 through 6 in overlapping relationship with the TFT panel. For a brief explanation, the same elements shown in FIGS. 2 through 6 are expressed with the same reference numeral and corresponding explanations will be omitted.

Now, referring to FIG. 7, the LCD comprises a TFT panel 110, a backlight assembly 120 and a frame unit 130. The backlight assembly 120 consists of an LGP 124, a plurality of LEDs 122 of different light radiation angle beside the LGP, and a series of sheets 128. Here, the LGP has the inactive light emitting distance 246 as explained in FIGS. 3 to 6. The optical sheets 128 are disposed over the LGP 124 and may overlap the inactive light emitting area 246.

The TFT panel 110 has a first transparent substrate 114, a second transparent substrate 116 which overlaps the first substrate 114 in one part and extends from the first substrate in another part. In detail, the extended area of the second substrate 116 is a circuitry unit 112 which is served as mounting area for drive ICs 119 or a film bonding area for electrical connection with other external circuits.

The circuitry unit 112 may cover the inactive area 246 of the LGP 124 for acquiring a compact LCD. In FIG. 7, the drive IC 119 is mounted at the circuitry unit 112, does not face the LEDs 122 and is covered by the top frame 134. The top frame 134 extends to the inner space of the TFT panel 110 from the circuitry unit 112 while the top frame 134 partially overlaps the TFT panel 110.

Because the first LED is thinner than the light incident surface of the LGP, light from the first LED does not propagate to the optical sheets or the TFT panel directly. On the other hand, the second LED may be placed to face the corner portion of the LGP and may not be placed within the active light emitting area of the LGP. Pursuant to the above explanation, the light emitting opening of each LED is covered by the circuitry unit of the TFT panel to direct light to the LGP.

Figure 8:
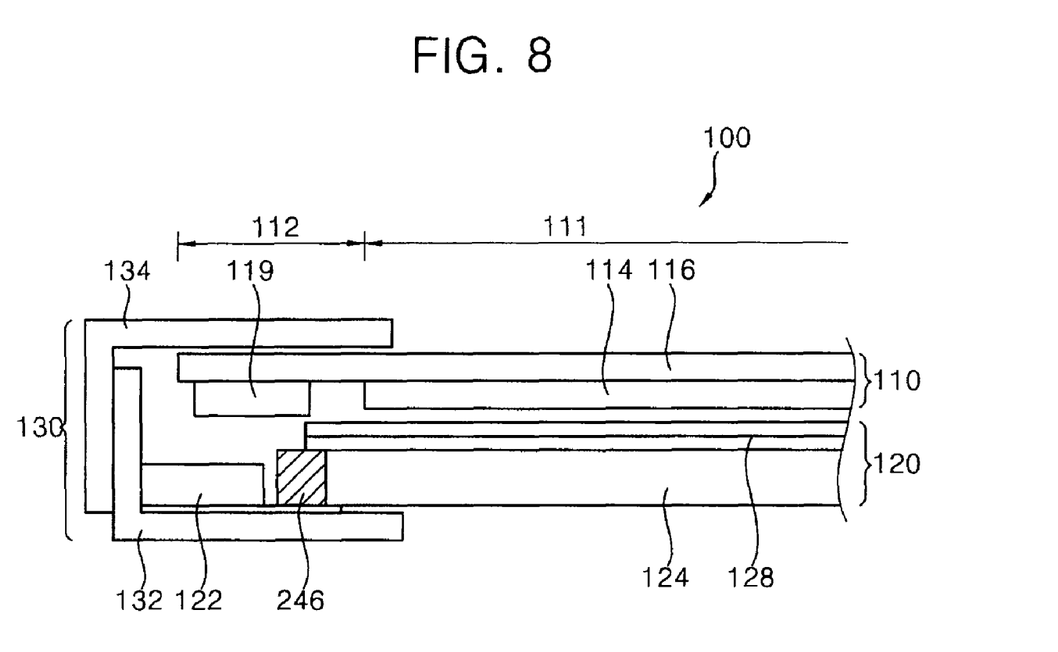
FIG. 8 is another cross-sectional view of an exemplary embodiment of the LCD, the LCD having a backlight assembly of FIG. 2 through FIG. 6, and a TFT panel overlapping the backlight assembly according to the present invention.

FIG. 8 is another cross-sectional view of the LCD having a backlight assembly of FIGS. 2 through 6 in overlapping relationship with the TFT panel. For a brief explanation, the same elements shown in FIGS. 2 through 7 are expressed with the same reference numeral and corresponding explanations will be omitted.

In FIG. 8, the drive IC 119 on the circuitry unit 112 is mounted differently from FIG. 7 to face the LEDs 122. Here, the circuitry unit 112 may serve as the film bonding area for connection with the external circuit. With the structure of FIG. 8, because the drive IC is mounted in an opposite orientation than as shown in FIG. 7, space between the TFT panel 110 and the top frame 134 may be saved resulting in a thinner LCD.

Even though, the present invention is explained with an LED as a point light source, other light generating sources can be used for accomplishing the spirit of the invention. For example, the point light source may be at least one of organic light emitting diode, plasma display panel, and field emission device.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. A backlight assembly comprising:
a light guiding plate having an incident light receiving surface with a first thickness and having an adjacent lateral surface, the light receiving surface having a major surface portion and a cutaway minor surface portion disposed at an edge of the major surface portion of the incident light receiving surface, the cutaway minor surface portion being slanted relative to the major surface portion and relative to the lateral surface;
a plurality of light emitting diodes (LEDs) disposed adjacent to the major and minor surface portions of the incident light receiving surface for thereby providing incident light to the major and minor surface portions, where each of the LEDs has a respective light radiation angle that is defined by a limited light emitting range of that LED;
wherein a first of the plural light emitting diodes faces in substantially paralleling manner, the major surface portion of the incident light receiving surface and is structured to have a respective first light radiation angle;
wherein a second of the plural light emitting diodes faces in substantially paralleling manner, the cutaway minor surface portion of the incident light receiving surface and is spaced apart from the first light emitting diode and is structured to have a respective second light radiation angle greater than the first light radiation angle; and
wherein the light guiding plate has a dark area and an active light emitting area.

2. The backlight assembly of claim 1, wherein the first light radiation angle is larger than 90 degrees.

3. The backlight assembly of claim 1, wherein the second light radiation angle is smaller than 90 degrees.

4. The backlight assembly of claim 1, wherein the second light emitting diode has a light emitting semiconductor, a housing encompassing the light emitting semiconductor and a light emitting opening on the housing.

5. The backlight assembly of claim 4, wherein the light emitting opening of the second light emitting diode faces the cutaway minor surface portion and is smaller than the cutaway minor surface portion.

6. The backlight assembly of claim 5, wherein the light emitting opening is substantially parallel with the cutaway minor surface portion.

7. The backlight assembly of claim 1, wherein the second light emitting diode has a housing located within an extensive area from the dark area.

8. The backlight assembly of claim 1, wherein the second light radiation angle has a first radiation edge line close to the incident light receiving surface and a second radiation edge line close to the lateral surface, wherein the light guiding plate has a dark area and active light emitting area within a light emitting surface, wherein the active light emitting area has a gap with the lateral surface, and wherein the second radiation edge line is within the range between the lateral surface and the active light emitting area.

9. The backlight assembly of claim 1, wherein the first light emitting diode is placed at a mid-point of the incident light receiving surface, and wherein the second light emitting diode is placed adjacent to the lateral surface and is thus spaced relatively far apart from the first light emitting diode.

10. The backlight assembly of claim 1, wherein the second light emitting diode is disposed at a corner portion of a long side of the light guiding plate.

11. The backlight assembly of claim 1, wherein the second light emitting diode is disposed at a portion of a long side of the light guiding plate.

12. A liquid crystal display, comprising:
a thin film transistor panel having a first substrate and a second substrate larger than the first substrate with circuitry unit area where a thin film transistor driving circuit is mounted,
a plurality of light emitting diodes (LEDs) each having a respective light radiation angle that is defined by a limited light emitting range of that LED;
said plural light emitting diodes including a first light emitting diode and a second light emitting diode providing light to the thin film transistor panel, the first and second light emitting diodes respectively having a first light radiation angle and a second light radiation angle, where the second light radiation angle is larger than the first light radiation angle, and
a light guiding plate next to the first and second light emitting diodes to propagate light from the first and second light emitting diodes and disposed under the thin film transistor panel,
wherein the light guiding plate has a light receiving surface having a major surface portion and a cutaway minor surface portion disposed at an edge of the major surface portion of the light receiving surface, the cutaway minor surface portion being slanted relative to the major surface portion, and has a dark area and an active light emitting area,
wherein the circuitry unit overlaps the first and second light emitting diodes, wherein the first light emitting diode faces in a substantially paralleling manner the major surface portion, and wherein the second light emitting diode faces in a substantially paralleling manner the cutaway minor surface portion.

13. The liquid crystal display of claim 12, wherein the circuitry unit overlaps the dark area of the light guiding plate.

14. A method for making a backlight assembly, the method comprising:
providing a plurality of light emitting diodes (LEDs) each having a respective light radiation angle that is defined by a limited light emitting range of that LED;
facing a first of the light emitting diodes toward a first point on an incident light receiving surface of a light guiding plate,
wherein the incident light receiving surface has a major surface portion and one or more cutaway minor surface portions each disposed at an edge of the major surface portion of the incident light receiving surface, the cutaway minor surface portions each being slanted relative to the major surface portion,
wherein the first light emitting diode is structured to respectively have a first light radiation angle; and
facing a second of the light emitting diodes toward a second point on the incident light receiving surface, wherein the second light emitting diode is structured to respectively have a second light radiation angle larger than the first light radiation angle,
wherein the second point is on one of the cutaway minor surface portions of the incident light receiving surface; and wherein the light guiding plate has a dark area and an active light emitting area.

* * * * *